(12) United States Patent
Samson et al.

(10) Patent No.: US 10,192,212 B1
(45) Date of Patent: Jan. 29, 2019

(54) PREPAID TRANSACTION HISTORY RECORD SYNCHRONIZATION ON A MOBILE COMMUNICATION DEVICE

(71) Applicant: Sprint Communications Company L.P., Overland Park, KS (US)

(72) Inventors: Kenneth W. Samson, Belton, MO (US); Stephen T. Pawlewicz, Overland Park, KS (US)

(73) Assignee: Sprint Communications Company L.P., Overland Park, KS (US)

(*) Notice: Subject to any disclaimer, the term of this patent is extended or adjusted under 35 U.S.C. 154(b) by 0 days.

(21) Appl. No.: 15/787,280

(22) Filed: Oct. 18, 2017

(51) Int. Cl.
    *G06Q 30/04*     (2012.01)
    *G06Q 20/32*     (2012.01)
    *G06Q 20/28*     (2012.01)
    *H04M 17/00*     (2006.01)

(52) U.S. Cl.
    CPC ............ *G06Q 20/32* (2013.01); *G06Q 20/28* (2013.01); *H04M 17/35* (2013.01); *H04M 2215/0164* (2013.01)

(58) Field of Classification Search
    CPC ..... H04W 24/10; H04W 24/04; H04W 14/04; H04W 4/24; H04W 4/26; H04W 12/12; G06F 9/465; G06F 11/3692
    USPC ............... 705/40-41; 455/406, 418; 370/331
See application file for complete search history.

(56) References Cited

U.S. PATENT DOCUMENTS

2008/0040265 A1* 2/2008 Rackley, III ........... G06Q 20/02
    705/40

\* cited by examiner

*Primary Examiner* — Phuoc H Doan

(57) ABSTRACT

A method of collecting transaction records on a pre-paid mobile communication device. The method comprising sending a request by an application to receive a plurality of transaction records; receiving the plurality of transaction records by the application, wherein each transaction record comprises a transaction record identifier. The method further comprising, for each transaction record, looking up a transaction record identifier in the non-transitory memory of the mobile communication device comprising a plurality of existing transaction records comprising transaction record identifiers from previously collected transaction records, if the transaction record identifier of the transaction record identifier does not match an existing transaction record identifier, and copying the transaction record and transaction record identifier to the memory of the mobile communication device.

20 Claims, 9 Drawing Sheets

PREPAID TRANSACTION HISTORY RECORD SYNCHRONIZATION ON A MOBILE COMMUNICATION DEVICE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A pre-paid mobile communication device uses credit that is purchased from a service provider in advance of wireless communication service to pay for mobile communication services as they are used. As mobile communication services are used, credit is deducted from the balance of the account based on the amount and type of service used. Pre-paid mobile device users are able to purchase credit for their mobile device in a variety of ways. When credit on a pre-paid mobile device runs out, the user is denied service until he or she buys more credit. Tens of millions of people use pre-paid mobile communication devices as a method of communicating. These users may frequently call customer care of the pre-paid mobile communication service provider in order to check the remaining balance available on the mobile device.

SUMMARY

In an embodiment, a method of collecting transaction records on a pre-paid mobile communication device is disclosed. The method comprises sending a request by an application executing on a mobile communication device to receive a plurality of transaction records of the mobile communication device and receiving the plurality of transaction records by the application, wherein each transaction record comprises a transaction record identifier for each transaction record. The method further comprises for each transaction record, looking up a transaction record based on a transaction record identifier in a non-transitory portion of a memory of the mobile communication device by the application, wherein the non-transitory portion of the memory of the mobile communication device comprises a plurality of existing transaction records comprising transaction record identifiers from previously collected transaction records, and if the transaction record identifier of the transaction record does not match an existing transaction record identifier, storing the transaction record and the transaction record identifier by the application to the non-transitory portion of the memory of the mobile communication device.

In another embodiment, a mobile communication device is disclosed. The mobile communication device comprises a processor, a non-transitory memory, and an application stored in the non-transitory memory. When executed by the processor, the application sends a request to receive a plurality of transaction records of the mobile communication device, receives the plurality of transaction records, wherein each transaction record comprises a transaction record identifier, for each transaction record, looks up a transaction record based on a transaction record identifier in a non-transitory portion of a memory of the mobile communication device, wherein the non-transitory portion of the memory of the mobile communication device comprises a plurality of existing transaction records comprising transaction record identifiers from previously collected transaction records, and if the transaction record identifier of the transaction record does not match an existing transaction record identifier, the application further stores the transaction record and the transaction record identifier to the non-transitory portion of the memory of the mobile communication device.

In yet another embodiment, a method of collecting transaction records on a pre-paid mobile communication device is disclosed. The method comprises sending a request by an application executing on a mobile communication device to receive a plurality of transaction records of the mobile communication device, receiving the plurality of transaction records by the application, wherein each transaction record comprises a transaction record identifier, and for each transaction record, looking up a transaction record based on a transaction record identifier in a non-transitory portion of a memory of the mobile communication device by the application, wherein the non-transitory portion of the memory of the mobile communication device comprises a plurality of existing transaction records comprising transaction record identifiers from previously collected transaction records. If the transaction record identifier of the transaction record does not match an existing transaction record identifier, the method further comprises, looking up an attribute of the transaction record by the application, based on the attribute of the transaction record, assigning the transaction record to a category according to a user-defined classification by the application, and storing the transaction record and the transaction record identifier according to the assigned category of the transaction record to the non-transitory portion of the memory of the mobile communication device by the application, and if the transaction record identifier of the transaction record matches an existing transaction record identifier, keeping the existing transaction record by the application.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
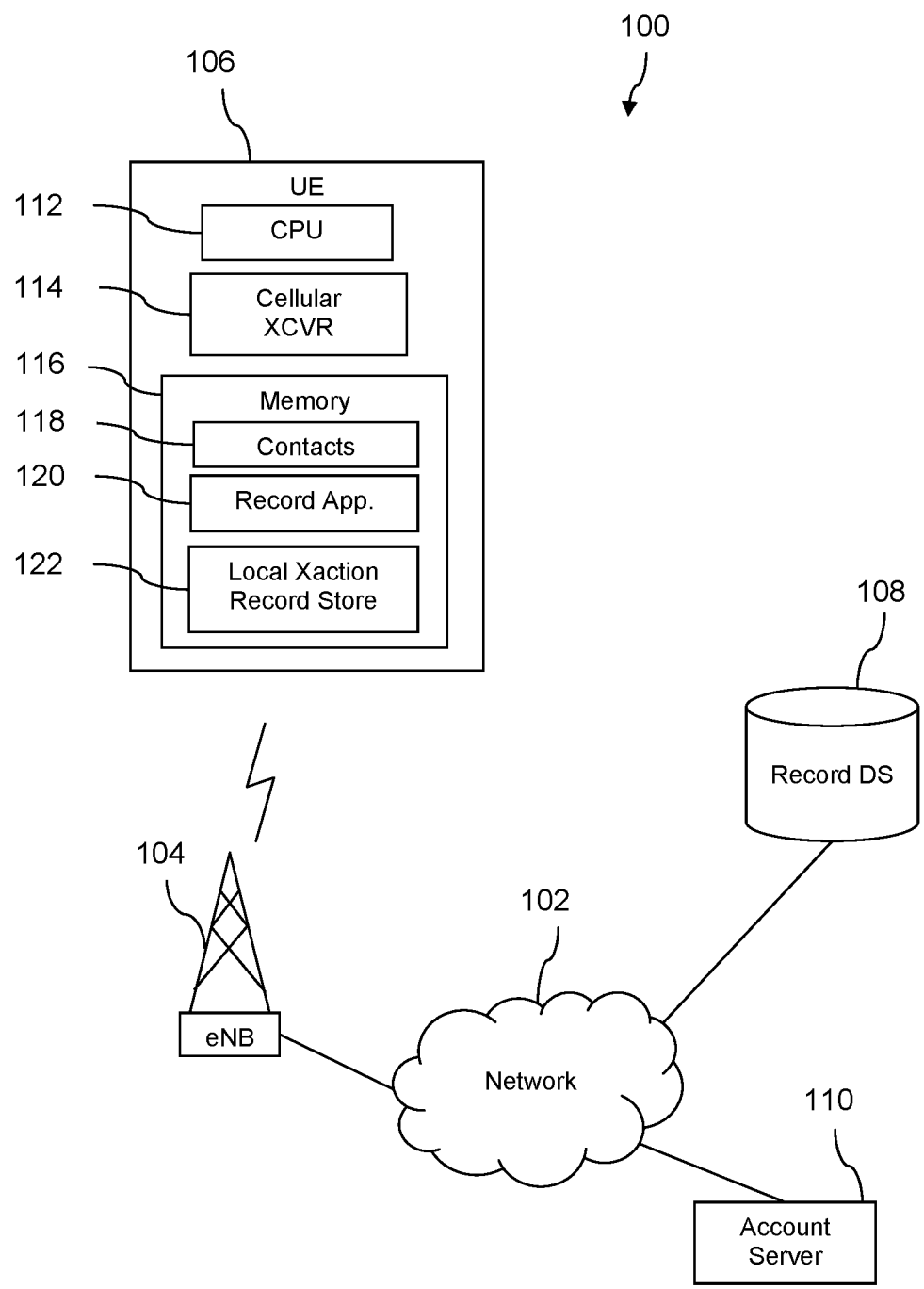
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Pre-paid mobile communication devices, also referred to as "pay-as-you-go" devices, entail having users buy credit before wireless communication services are rendered. As a user uses the wireless communication services, credit is deducted from the available balance, and when there is no credit left on the customer's account, requests for wireless communication service are denied by the wireless communication service provider until more credit is purchased. As opposed to a post-paid mobile communication device, where payment is made after wireless communication services are provided, a pre-paid mobile communication device account does not receive an invoice or usage record from the service provider. Tens of millions of people use pre-paid wireless communication services. In order to check the remaining credit balance on their accounts, pre-paid mobile communication device users place calls to a customer care line of the service provider, which places a burden on both the user and provider.

The frequent calls to customer care may cost the service provider millions of dollars per year of resources. Sometimes, a user may call customer care up to four times per day to check an account status. Customers may get frustrated with the amount of time wasted from placing calls to customer care and cycling through numerous call options just to obtain the information associated with his or her account, such as the remaining balance. Customers may also want to periodically determine the distribution of calls placed, messages sent, and/or data used with respect to business or personal matters. Pre-paid mobile communication plans do not record extensive information about wireless communication services used—the account balance is the primary information tracked. It may be important for a user to determine the amount of wireless communication services used for business-related reasons for tax reporting purposes. A pre-paid user may wish to share his or her transaction history with an employer. Since a pre-paid plan does not provide a digital or physical report, sharing the transaction history is not convenient.

Additionally, service providers may only keep transaction history information about a user's account for up to 90 days. Accounting for detailed information about wireless communication services and storing that information for a more extended period of time such as those that are collected in post-paid service plans would require vast resources in storing and transmitting the data to the tens of millions of pre-paid mobile communication device users. Transaction history is typically stored in servers in the network of the service provider. Post-paid plans provide transaction history information such as call records, text records, and data usage records. Data collected for transaction history may include a destination mobile phone number, date and time associated with the entry, content size, and usage volume, amongst other information.

The present disclosure teaches a transaction record native application that collects transaction records and classifies transaction records that provides a technical solution to the problem of monitoring the transaction history for users of pre-paid mobile communication device users. The transaction record application may be installed on the mobile communication device as a native application. A native application is adapted to the hardware of a specific mobile communication device and is installed during the manufacturing process. A native application typically has access to operating system services and to peripheral devices on the mobile communication device that user applications may not be granted, for example to avoid untested and/or corrupted user applications from degrading service of the device and/or of a wireless communication network. Said in other words, a native application may be granted operating system access privileges that are greater than the access privileges granted to user installed mobile applications. Native applications may be considered by original equipment manufacturers (OEM) and/or wireless communication service providers to be inherently more secure because the OEM can control the testing of and exercise configuration control over the native applications that they install on the device during manufacturing. In another embodiment, the transaction record application may be installed not as a native application but as a user application.

The transaction record application allows transaction records to be transmitted via the network to a mobile communication device of the pre-paid user. Instead of storing transaction history on servers in the network for extended periods of time, which may consume a massive amount of storage resources for the service provider, transaction history is stored on the mobile communication device itself. Since mobile communication devices such as smart phones may have from 32 to 256 GB of storage space, the transaction history would use only small portion of that storage space. A service provider may keep transaction history data for a pre-paid mobile communication device for up to 90 days before they are deleted. The transaction record application may request transaction records periodically, such as every day, every week, every month, or any other period of time, and store the transaction records for over 90 days on the mobile communication device.

In an embodiment, the transaction record application is installed after the pre-paid mobile communication device has been used to conduct wireless communication services. For example, the transaction record application may be installed as a native application during a maintenance release (MR) or as a user application. If a user requests transaction record history of the previous 90 days, the network may only send one or two weeks of data at a time in order to reduce the transmitting burden on the network that may occur from sending all 90 days of transaction history at once. The network may send transaction records for the earliest time, such as from Day 90 to Day 85 to avoid lost data due deletion of aged transaction records from the network. In the next request, the network may proceed to send transaction records from Day 84 to Day 70. This pattern may continue until the transaction record history is up-to-date. In an embodiment, the network may notify the mobile communication device if transaction records are about to be deleted from the server (e.g. after 90 days has elapsed from the wireless communication service conducted). The transaction record application may determine if retaining the transaction record is desired.

In an embodiment, a service provider may distinguish each transaction record using numerical or alphanumerical labeling system, which would serve as a transaction record identifier (e.g., a serial number). The application may also look up a transaction record by the last transaction record identifier that was received in the previous retrieval and request the transaction records that were generated subsequently. A user may request a specific transaction record from the network by requesting a transaction record identifier. A transaction record identifier may be a back-end labeling system by the service provider used in order to distinguish transaction records. When a user requests and receives the transaction record history of the mobile communication device, the transaction record application may use the transaction record identifiers to transmit the change or delta from the existing transaction record history to avoid storing duplicate transaction records in the mobile communication device. The transaction record application looks up each transaction record identifier against the existing transaction records in the transaction record application. If a transaction record identifier does not yield a match in the existing transaction records, then the application would copy the transaction record to the transaction record application.

The transaction record application may further classify the transaction record according to a destination phone number of the mobile communication device. Prior to requesting transaction record history, the user may define a contact's information such as a phone number or an email address in his or her address book as a business or a personal contact, amongst other categories. The user may also define a time interval of day designated to working hours, such as from 8 AM to 5 PM on weekdays. If the transaction record does not yield a match in the existing transaction records, the transaction record application may look up an attribute (e.g., the destination phone number or time of day of the first transaction record) and classify the transaction record as a business or personal matter.

In an embodiment, the transaction record application may generate a usage report that determines the ratio of wireless communication services used for business and personal purposes. This may be useful in the case of business tax reporting purposes or if an employer requests mobile communication reports of the user. While the present disclosure teaches two classifications of contacts, it is understood that any number of classifications of contacts may be used. In an embodiment, the transaction record application may categorize contacts as being a business or non-business contact. For example, if a transaction record is not associated with a mobile phone number of a business contact, it is categorized as a non-business contact. The user does not have to explicitly define a category of a contact's phone number.

In an embodiment, the transaction record application may obtain from an account server on the network, an account balance associated with the mobile communication device. The application may then determine the cost of wireless communication service usage based on a fee schedule of the account and the obtained transaction records and display to the user the remaining account balance of the mobile communication device. The amount associated with wireless communication services related to business and personal matters may also be displayed by separate values. In an embodiment, a pre-paid wireless communication service account may be that of an unlimited plan, wherein for a predetermined payment amount, a user may have unlimited access to wireless communication services such as voice calling, text messaging, multimedia messaging, and/or data browsing services. The transaction record application may determine from the usage report the proportion of services used for business reasons and/or personal reasons from the total amount of wireless communication services used. This proportion may then be used to assign a monetary value to wireless communication services involving business matters from the predetermined payment amount.

Turning now to FIG. 1, a system 100 is described. In an embodiment, the system 100 comprises a wireless communication network 102, an eNodeB (eNB) 104, a user equipment (UE) 106, a transaction record data store 108, and an account server 110. The wireless communication network 102 may comprise a public network, a private network, or a combination thereof. It is understood the system 100 may comprise any number of eNBs 104, UEs 106, transaction record data stores 108, and account servers 110. The UE 106 may be referred to as a mobile communication device 106, wherein the mobile communication device 106 is one of a mobile phone, a smart phone, a personal digital assistant (PDA), a wearable computer, a headset computer, a media player, a laptop computer, a notebook computer, or a table computer.

In an embodiment, the mobile communication device 106 comprises a central processing unit (CPU) 112, at least one radio transceiver 114, and a memory 116. The radio transceiver 114 may communicatively couple the mobile communication device 106 to the eNB 104 and to the wireless communication network 102. In some contexts the eNB 104 may be referred to as a cell site, a base transceiver station (BTS), or another term. The radio transceiver 114 may establish wireless communication links with an eNB 104 according to one or more of a long term evolution (LTE), a code division multiple access (CDMA), a global system for mobile communication (GSM), or a worldwide interoperability for microwave access (WiMAX) wireless communication protocol. The memory may comprise a non-transitory memory portion such that data or instructions stored in the non-transitory memory portion are retained through power off/power on cycles (e.g., through reboots and power cycles). The non-transitory portion of memory may comprise a list of contacts 118, a transaction record application 120 (hereinafter referred to as the client or client application), and a local transaction record store 122 (hereinafter referred to as the local store). A contact 118 may comprise a name associated with contact information such as a mobile phone number or email address, or any other wireless communication identification information. The contact 118 may be further classified by the user of the mobile device 106 into a group. In an embodiment, the groups may be one of a business associate, personal contact, or a family member. The contact 118 may also not be associated with a group.

In an embodiment, a service provider may provide wireless communication services to the mobile device 106 on a pre-paid plan basis, wherein credit on a wireless communication service account is purchased before wireless communication services are performed by the service provider. As wireless communication services are conducted, credit is deducted from the balance. Information regarding the pre-paid account such as the account balance may be stored in the account server 110. The transaction record data store 108 may collect and store transaction record history of a mobile device 106. The transaction record application 120 periodically collects transaction record history from the transaction record data store 108 by requesting and receiving the transaction records over the network 102. Transaction records may be the wireless service carried out by the service provider on the mobile device 106. Data collected for transaction record history may include a destination mobile phone number, date and time associated with the entry, content size, and usage volume, amongst other information. The local store 122 is described in further detail in reference to FIG. 3.

In some instances, the transaction record data store 108 may store up to 90 days of transaction record history for the mobile device 106, and the transaction records may be deleted from the transaction record data store 108 after 90 days. It is understood that while the transaction record data store 108 in this embodiment stores information for up to 90 days, other transaction record data stores 108 may store information for any period of time, such as for 30 days or 60 days. The transaction record data store 108 is described in further detail in reference to FIG. 2. Service providers may not provide users of mobile devices 106 with a detailed transaction record history for pre-paid service plans. Since the mobile device 106 does not receive an invoice or usage record from the service provider, users call a customer care line of a service provider or access a website of the service provider in order to check their account balance. This may inconvenience the user and cost the service provider a great deal of money and resources in providing this information. The transaction record application 120 may periodically request and receive transaction record history of a mobile device 106 from the transaction record data store 108. The collected transaction record history of the mobile device 106 may be stored for a time longer than 90 days in the local transaction data store 122.

Figure 2:
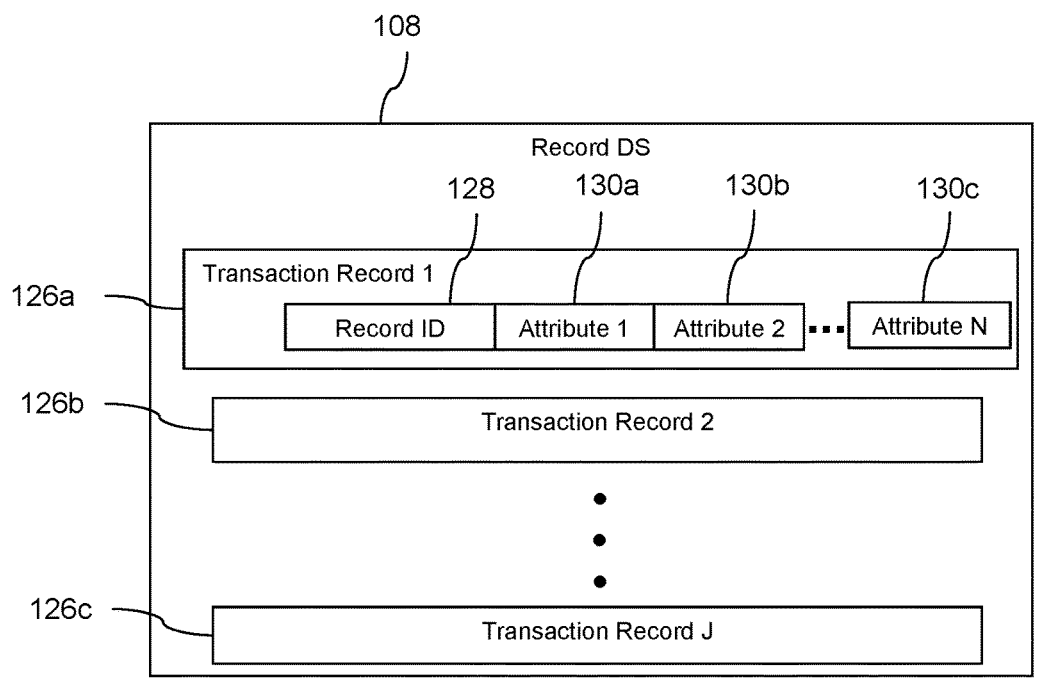
FIG. 2 is a block diagram of a transaction record data store according to an embodiment of the disclosure.

Turning now to FIG. 2, further details of the transaction record data store 108 are described. In an embodiment, the transaction record data store 108 may comprise a plurality of transaction records 126 that each associates a record identity 128 with one or more attributes. For example, the data store 108 may comprise a first transaction record 126a, a second transaction record 126b, and a j-th transaction record 126c, where the data store 108 comprises j-number of transaction records 126. The first transaction record 126a is illustrated as associating the record identity 128 to a first attribute 130a, a second attribute 130b, and an N-th attribute 130c, where the transaction record 126a associates the record identity 128 to N-number of attributes. Transaction records 126 may associate a record identity 128 to one attribute, to two attributes, to three attributes, or any number of attributes.

Attributes 130 may comprise one of a destination mobile phone number, date and time associated with the entry, content size, and usage volume, amongst other information. For example, attribute 130a may designate a voice call destination mobile phone number, attribute 130b may designate a date and time of voice call, and attribute 130c may designate a duration of voice call performed by the mobile device 106 over the network 102. For another example, attribute 130a may designate a web address of a data browsing session, attribute 130b may designate a date and time of the data browsing session, and attribute 130c may designate amount of data used for the data browsing session by the mobile device 106 over the network 102. While examples for a voice call and data browsing session are used, it is understood that attributes 130 may be associated with any kind of wireless data communication.

Figure 3:
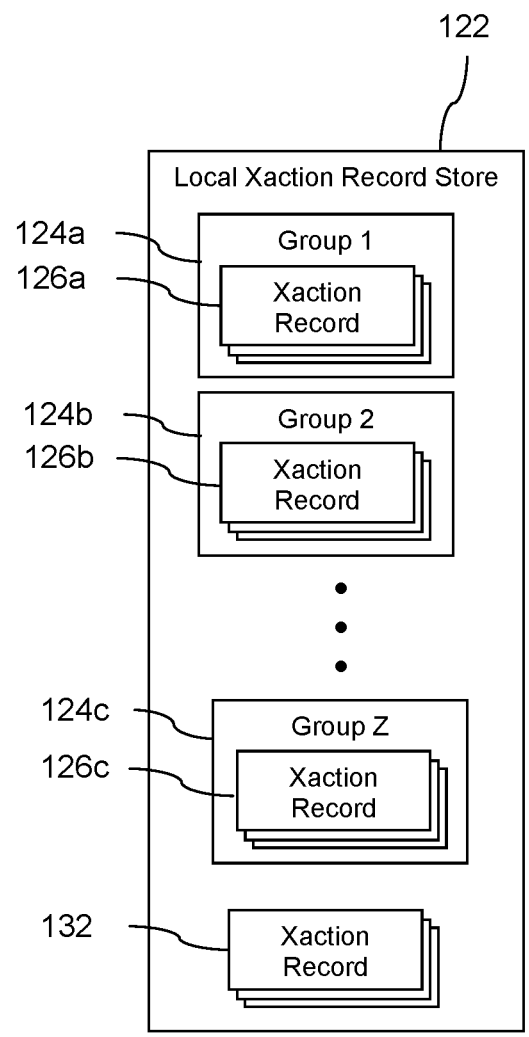
FIG. 3 is a block diagram of a local transaction record store according to an embodiment of the disclosure.

Turning now to FIG. 3, further details of the local transaction record store 122 are described. The local transaction record store 122 comprises a plurality of groups 124 such as a first group 124a, a second group 124b, and a z-th group 124c, where the local store 122 comprises Z-number of groups 124. The groups 124a, 124b, 124c may each comprise a plurality of transaction records 126a, 126b, and 126c, respectively. In an embodiment, there may exist a plurality of transaction records in the local store 122 not associated with a group 124a, 124b, 124c. The groups 124 may be categorized according to a classification of a contact 118. For example, the group 124a may comprise business contacts, and the group 124b may comprise personal contacts. A transaction record 126a of a voice call to a business contact 118 may be assigned to a group 124a. The contact 118 may be saved as a business contact by the user of the mobile device 106. In an embodiment, a contact 118 may also not be associated with a group 124.

With reference now to FIG. 1, FIG. 2, and FIG. 3, the transaction record application 120, upon execution by the processor 112, may request and receive from the transaction record data store 108 via the network 102, a plurality of transaction records 126 each associated with a record identity 128 with one or more attributes 130. In an embodiment, the record identity 128 may be a monotonic, alphanumeric, or any type of identification arrangement by a service provider that distinguishes the transaction records 126 from one another. In some embodiments, the record identity 128 may be referred to as a serial number. The record identity 128 may be a back-side identifier that is not presented to the user of the mobile device 106. The transaction record application 120 may request transaction records 126 periodically, such as every day, every other day, every week, every month, or any other period of time. The transaction record application 120 may use the record identity 128 to look up the plurality of transaction records 126 in the local store 122 and store the change or delta of transaction records 126 in the memory 116 of the mobile device 106. Storing the delta of plurality of transaction records 126 would avoid duplicates of transaction records 126 to be stored in the local store 122, which would take up storage space on the mobile device 106.

In an embodiment, the transaction record application 120 may request a transaction record 126 from the transaction record data store 108 based on a record identity 128 from a previously conducted wireless communication service. For example, if a mobile device 106 transmitted a text message to a destination mobile device, a user may request via the transaction record application 120 to receive the transaction record 126 associated with the text message from the transaction record data store 108. In an embodiment, the record identity 128 may be a back-side identifier used to log and keep track of wireless communication services by the provider, and the record identity 128 may not be seen by the user. The transaction record data store 108 may store a transaction record 126 for up to a certain period of time before the transaction record 126 is subject to deletion. The period of time may be 30 days, 60 days, 90 days, or any other period of time. In the example of the 90 day storage period, if 90 days has elapsed from when the wireless communication service was conducted, the network 102 may notify the transaction record application 120 that the transaction record 126 associated with the service is about to be deleted. The user may inform the client 120 if the transaction record 126 should be kept on the mobile device 106.

The transaction record application 120 may group the plurality of transaction records 126 based on an attribute 130 (e.g., a destination phone number or a date and time of wireless communication service). A destination phone number may be associated with a contact 118 that the user classified into a business group 124a. For example, if the contact 118 is that of a customer of the user, the contact 118 would be considered a business contact in the business group 124a. The user may have also classified a time of day of when wireless communication services are conducted. For example, the user may define to the transaction record application 120 that any data browsing services used between the hours of 8 AM to 5 PM on weekdays are considered to be business-related usages. If the user conducts a data browsing session at 9 PM on Saturday, the data tonnage used would be considered to fall in the personal group 124b of the local store 122. A transaction record 132 not associated with any group may be stored in the local store 122. In an embodiment, transaction records 126 may be stored in the transaction record application 120 of the mobile device 106.

The transaction record application 120 may generate usage reports based on the transaction records 126 and groups 124 in the local store 122. In an embodiment, a usage report may be a file or document provided from the service provider that details the transaction record history of the mobile device 106. The usage report may be shared in some embodiments. For example, the user may email the usage report to an employer for billing purposes. The transaction record application 120 may generate a usage report for services performed by a mobile device 106 according to the groups 124. For example, a usage report may separate the transaction records 126 for the business group 124a and the personal group 124b. The transaction records 126 may be further broken down into type of wireless communication service (e.g., voice calls, SMS, MMS, data browsing). The user may regulate the level of detail of the usage report. For example, the user may control whether to provide specific transaction record information, such as the contact's phone number or the URL of the website visited. The user may also only provide general transaction record information such as time and duration of voice call. The usage report may also show the amount of credit used by the mobile device 106 and the remaining account balance. The transaction record application 120 may obtain from the account server 110 the account balance and a rate schedule for wireless communication services of the service provider.

The transaction record application 120 may use the rate schedule to calculate the monetary value of wireless communication services used from the transaction records 126. The transaction record application 120 may determine the amount of credit used for business transactions and separately report it from other transactions. The total amount used from all transactions may be deducted from the account balance to produce a new and current account balance of the mobile device 106. The user may generate the usage report at-will to check account usage and credit balance. In an embodiment, the mobile device 106 may have an unlimited pre-paid service plan, where by paying a predetermined amount, the user has unlimited access to wireless communication services (e.g., unlimited voice calls, unlimited text messages, and unlimited data usage). Therefore, constantly checking the account balance would not be as important to the user. However, the user may want to know the proportion of services used for business purposes for tax reporting reasons. The usage report may use the proportion of business transaction records the amount paid for the plan to determine the monetary value associated with business transaction records. For example, for all the wireless communication services used for a monthly unlimited plan, if 70% of services were used for business transactions, then 70% of the amount paid may be allotted as business-related expenses.

Figure 4:
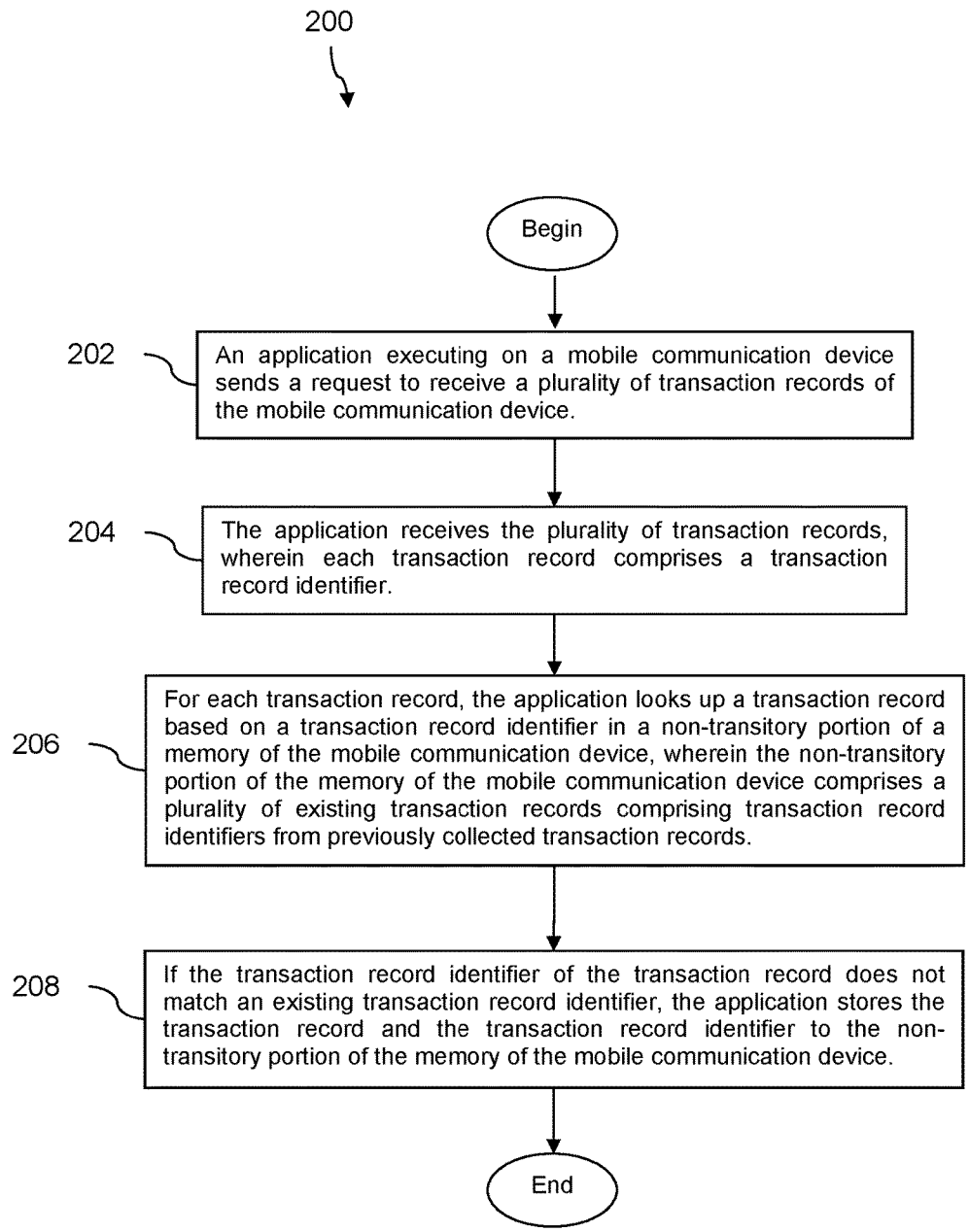
FIG. 4 is a flow chart of a method according to an embodiment of the disclosure.

Turning now to FIG. 4, a method 200 is described. In an embodiment, the method 200 may be performed to collect transaction records on a pre-paid mobile communication device. At block 202, an application executing on a mobile communication device sends a request to receive a plurality of transaction records of the mobile communication device. In some embodiments, the application may be a native application implemented by the original equipment manufacturer (OEM) that has a greater access to device hardware and confidential information. At block 204, the application receives the plurality of transaction records, wherein each transaction record comprises a transaction record identifier. The transaction record identifier may be a back-side monotonic or alphanumerical tag used by the service provider to distinguish transaction records.

At block 206, for each transaction record, the application looks up a transaction record based on a transaction record identifier in a non-transitory portion of a memory of the mobile communication device, wherein the non-transitory portion of the memory of the mobile communication device comprises a plurality of existing transaction records comprising transaction record identifiers from previously collected transaction records. At block 208, if the transaction record identifier of the transaction record does not match an existing transaction record identifier, the application stores the transaction record and the transaction record identifier to the non-transitory portion of the memory of the mobile communication device. The application may store the change or delta of the plurality of transaction records that are not found in the existing transaction records to avoid storing duplicates of transaction records on the mobile communication device.

Figure 5:
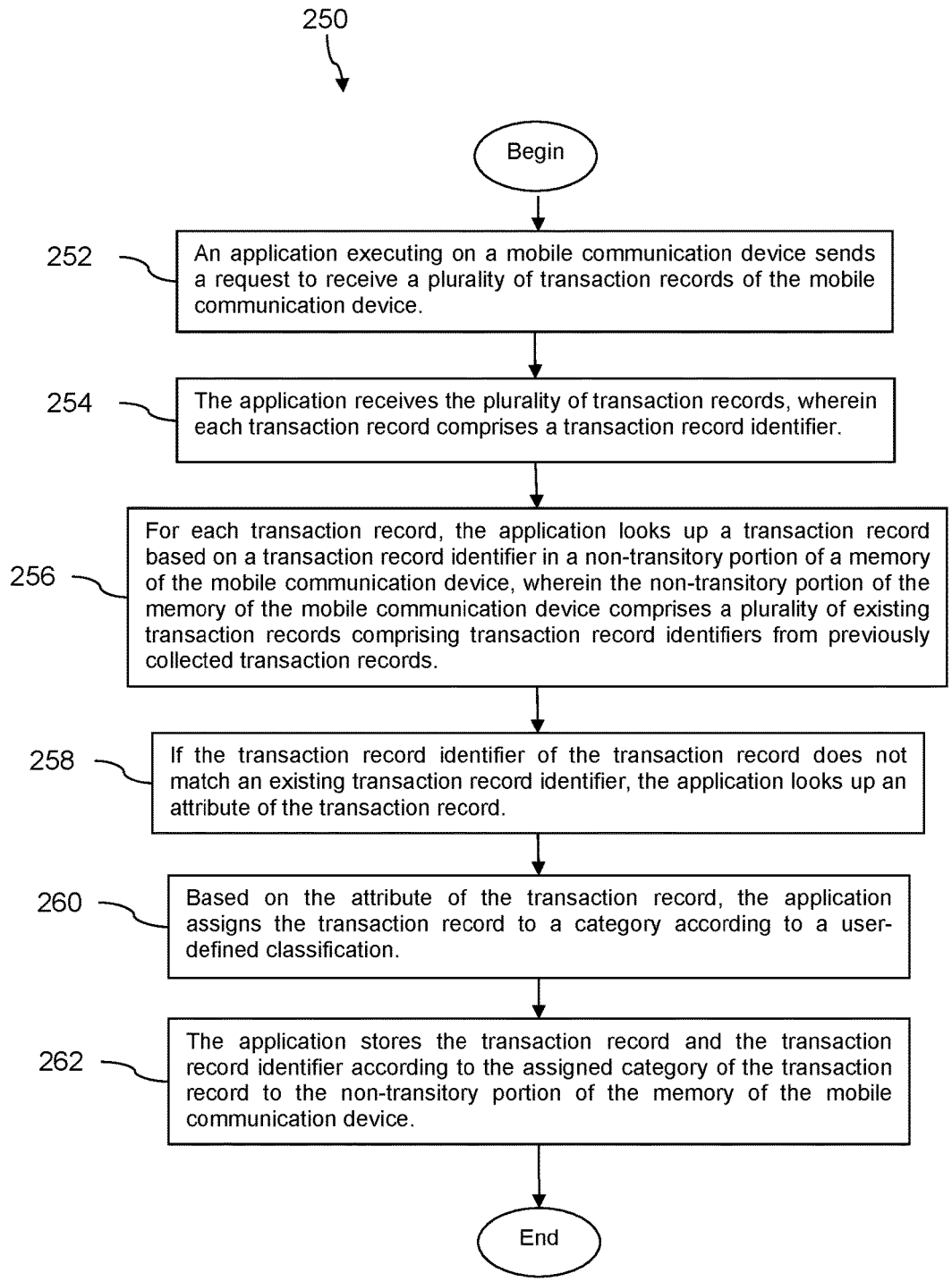
FIG. 5 is a flow chart of a method according to an embodiment of the disclosure.

Turning now to FIG. 5, a method 250 is described. In an embodiment, the method 250 may be performed to collect transaction records and store the transaction records based on a group on a pre-paid mobile communication device. At block 252, an application executing on a mobile communication device sends a request to receive a plurality of transaction records of the mobile communication device. At block 254, the application receives the plurality of transaction records, wherein each transaction record comprises a transaction record identifier. At block 256, for each transaction record, the application looks up a transaction record based on a first transaction record identifier in a non-transitory portion of a memory of the mobile communication device, wherein the non-transitory portion of the memory of the mobile communication device comprises a plurality of existing transaction records comprising transaction record identifiers from previously collected transaction records.

At block 258, if the transaction record identifier of the transaction record does not match an existing transaction record identifier, the application looks up an attribute of the transaction record. The attribute of the transaction records may be one or more of a destination phone number, time and day of wireless communication service conducted, duration of wireless communication service, type of wireless communication service, or anything else that further defines the transaction record. At block 260, based on the attribute of the transaction record, the application assigns the transaction record to a category according to a user-defined classification. A user may define an attribute to a variety of classifications, such as a business or personal classification. In some embodiments, the user may define a classification as a transaction record that does not belong to a classification such as a business classification for business contacts and a non-business classification for all other contacts that do not fall into the business classification. At block 262, the application stores the transaction record and the transaction record identifier according to the assigned category of the transaction record to the non-transitory portion of the memory of the mobile communication device. It is possible for a transaction record to not be associated with a category on the mobile communication device.

Figure 6:
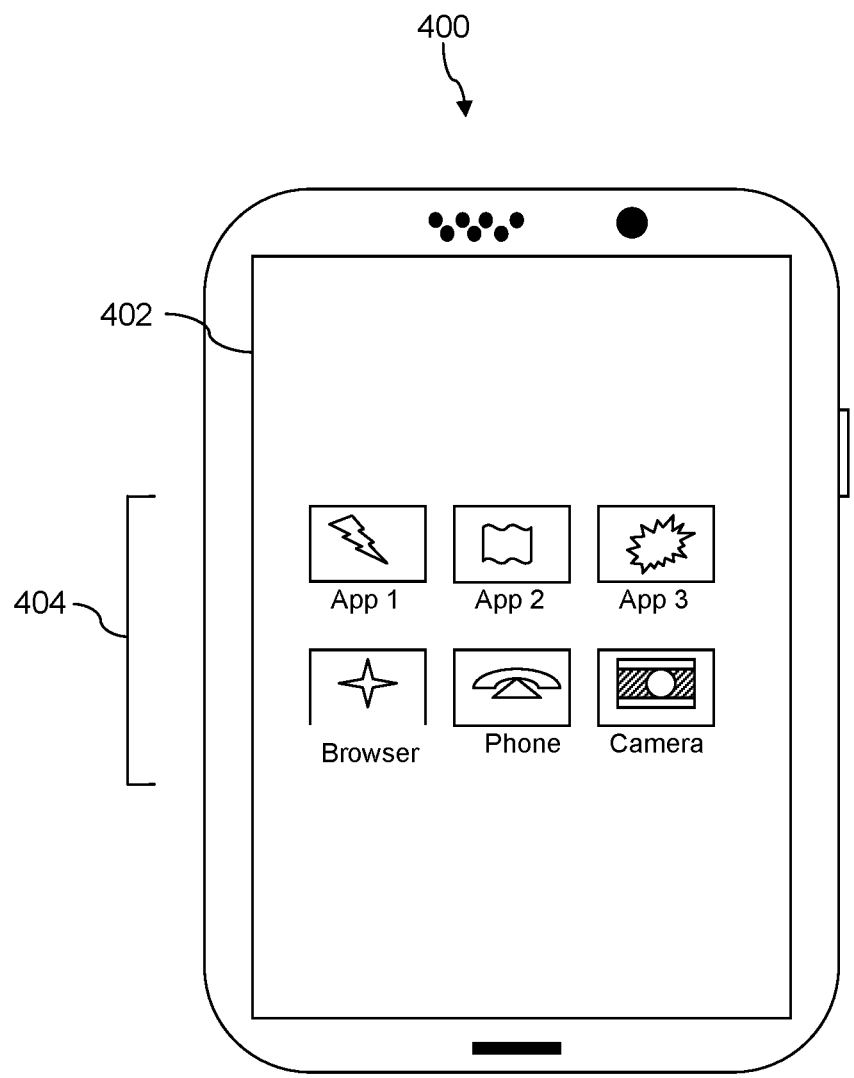
FIG. 6 is an illustration of a mobile communication device according to an embodiment of the disclosure.

FIG. 6 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 7:
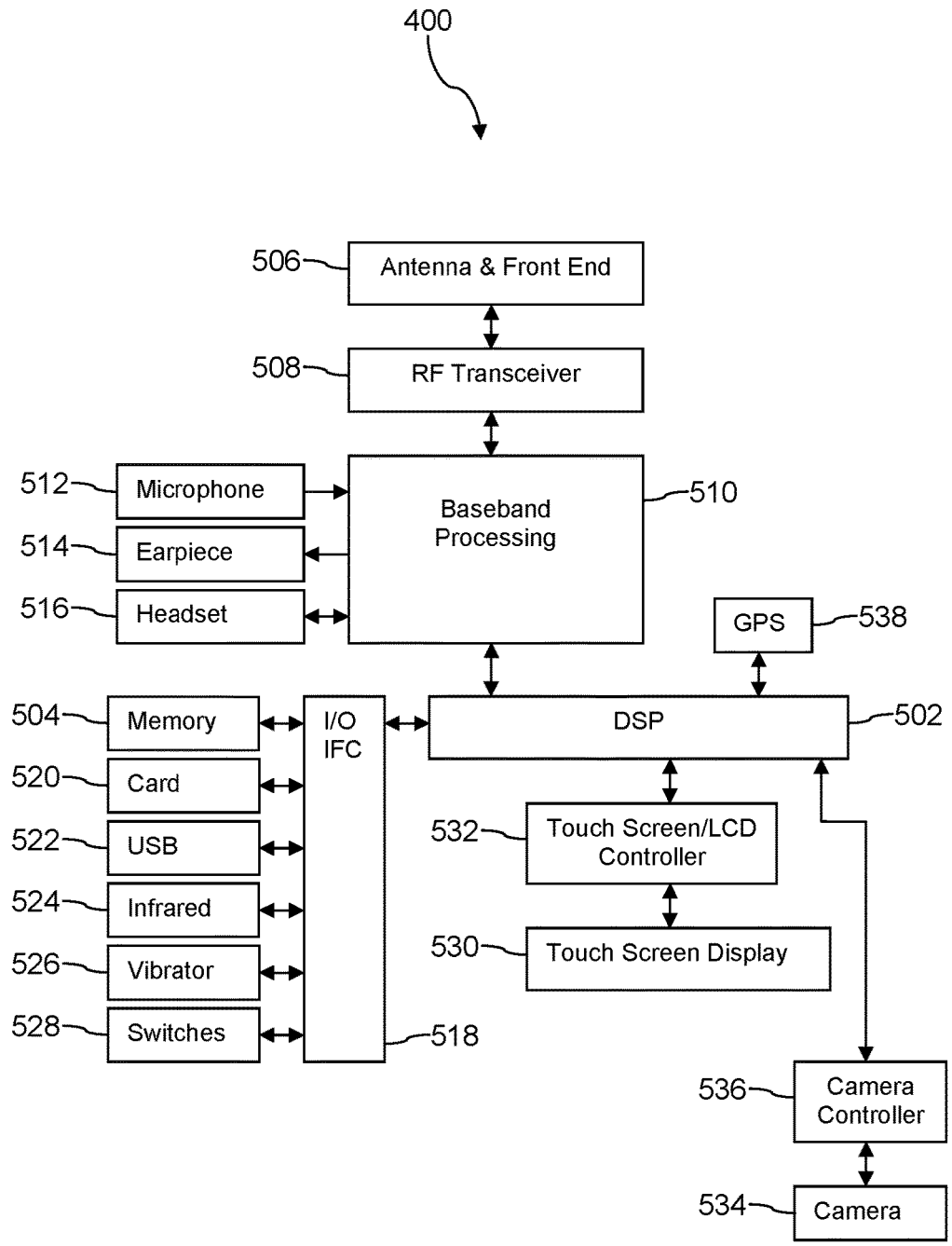
FIG. 7 is a block diagram of a hardware architecture according to an embodiment of the disclosure.

FIG. 7 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 8A:
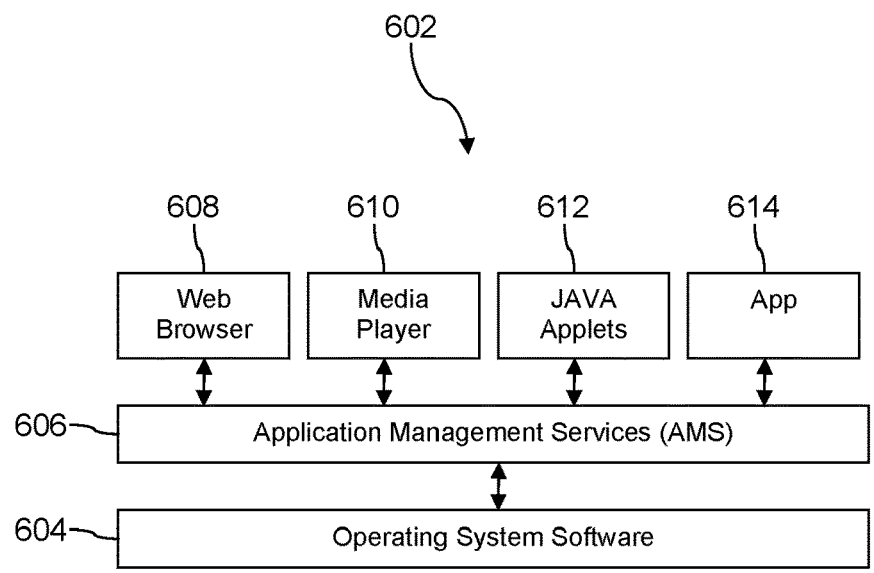
FIG. 8A is a block diagram of a software architecture according to an embodiment of the disclosure.

FIG. 8A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 8A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 8B:
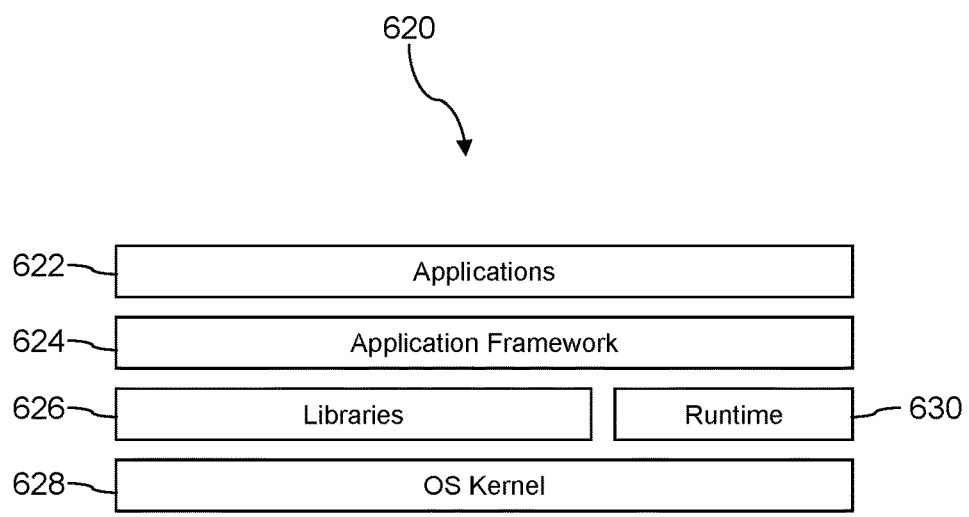
FIG. 8B is a block diagram of another software architecture according to an embodiment of the disclosure.

FIG. 8B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 9:
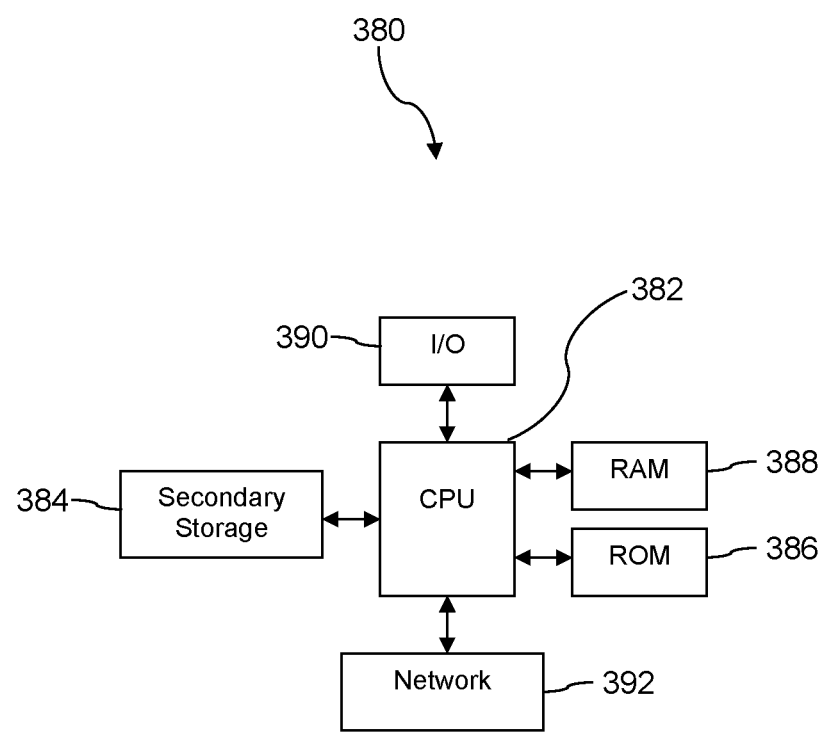
FIG. 9 is a block diagram of a computer system according to an embodiment of the disclosure.

FIG. 9 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of collecting transaction records on a prepaid mobile communication device, each step of the method performed by an application executing on a mobile communication device, the method comprising:
  sending a request to receive a plurality of transaction records of the mobile communication device, wherein the plurality of transaction records comprise information regarding wireless service carried out by a service provider on the mobile communication device including one or more voice call records, one or more message records, and one or more data connection records;

receiving the plurality of transaction records, wherein each transaction record comprises a transaction record identifier;

for each transaction record,
- looking up a transaction record in a non-transitory portion of a memory of the mobile communication device based on a transaction identifier of the transaction record, wherein the non-transitory portion of the memory of the mobile communication device comprises a plurality of existing transaction records comprising transaction record identifiers from previously collected transaction records;
- if the transaction record identifier of the transaction record does not match an existing transaction record identifier of a previously collected transaction record stored in the non-transitory portion of the memory of the mobile communication device, storing the transaction record and the transaction record identifier in the non-transitory portion of the memory of the mobile communication device;

determining a current account balance based on one or more transaction records stored in the non-transitory portion of the memory of the mobile communication device; and generating and displaying a usage report that includes the current account balance.

2. The method of claim 1, wherein each of the one or more voice call records comprises a voice call destination mobile phone number, a duration of the voice call, and a date and time of the voice call.

3. The method of claim 1, each of the one or more message records comprises a destination mobile phone number, a message content size, and a date and time of text sent.

4. The method of claim 1, wherein each of the one or more data connection records comprises data volume and a date and time associated with the data connection.

5. The method of claim 1, wherein the usage report comprises one of total number of minutes of voice calls conducted, total content size of text messages transmitted, or total data usage by the mobile communication device.

6. The method of claim 5, further comprising:
- requesting by the application, a monetary account balance of the mobile communication device;
- receiving by the application, the monetary account balance of the mobile communication device;
- calculating by the application, the wireless communication service usage according to a fee schedule of the mobile communication device based on the usage report; and
- deducting by the application the wireless communication service usage from the account balance to determine the current account balance.

7. The method of claim 1, wherein the application is a native application, and wherein the native application is adapted to the hardware of the mobile communication device.

8. A pre-paid mobile communication device comprising:
a processor;
a non-transitory memory;
a radio transceiver; and
an application stored in the non-transitory memory that, when executed by the processor;
- sends a request to receive a plurality of transaction records of the mobile communication device, wherein the plurality of transaction records comprise information regarding wireless service carried out by a service provider on the mobile communication device including one or more voice call records, one or more message records, and one or more data connection records;
- receives the plurality of transaction records, wherein each transaction record comprises a transaction record identifier;
- for each transaction record,
  - looks up a transaction record in a non-transitory portion of a memory of the mobile communication device based on a transaction identifier of the transaction record, wherein the non-transitory portion of the memory of the mobile communication device comprises a plurality of existing transaction records comprising transaction record identifiers from previously collected transaction records;
  - if the transaction record identifier of the transaction record does not match an existing transaction record identifier of a previously collected transaction record stored in the non-transitory portion of the memory of the mobile communication device, stores the transaction record and the transaction record identifier in the non-transitory portion of the memory of the mobile communication device;
- determines a current account balance based on one or more transaction records stored in the non-transitory portion of the memory of the mobile communication device; and
- generates and displays a usage report that includes the current account balance.

9. The mobile communication device of claim 8, wherein the application sends a request to receive a plurality of transaction records at a periodic interval of time.

10. The mobile communication device of claim 9, where the periodic interval of time is one day, one week, two weeks, or one month.

11. The mobile communication device of claim 8, wherein the application requests transaction records from a specific time period.

12. The mobile communication device of claim 8, wherein the application requests transaction records based on a specific transaction record identifier.

13. The mobile communication device of claim 8, wherein the radio transceiver established wireless communication links with a cell site according to a long term evolution (LTE), a code division multiple access (CDMA), a global system for mobile communication (GSM), or a worldwide interoperability for microwave access (WiMAX) wireless communication protocol.

14. The mobile communication device of claim 8, wherein the mobile communication device is one of a mobile phone, a smart phone, a personal digital assistant (PDA), a wearable computer, a headset computer, a laptop computer, a tablet computer, or a notebook computer.

15. A method of collecting transaction records on a pre-paid mobile communication device, each step of the method performed by an application executing on a mobile communication device, the method comprising:
- sending a request to receive a plurality of transaction records of the mobile communication device, wherein the plurality of transaction records comprise information regarding wireless service carried out by a service provider on the mobile communication device including one or more voice call records, one or more message records, and one or more data connection records;

receiving the plurality of transaction records, wherein each transaction record comprises a transaction record identifier;

for each transaction record,
- looking up a transaction record in a non-transitory portion of a memory of the mobile communication device based on a transaction identifier of the transaction record, wherein the non-transitory portion of the memory of the mobile communication device comprises a plurality of existing transaction records comprising transaction record identifiers from previously collected transaction records;
- if the transaction record identifier of the transaction record does not match an existing transaction record identifier of a previously collected transaction record stored in the non-transitory portion of the memory of the mobile communication device,
  - looking up an attribute of the transaction record;
  - based on the attribute of the transaction record, assigning the transaction record to a category according to a user-defined classification;
  - storing the transaction record and the transaction record identifier according to the assigned category of the transaction record in the non-transitory portion of the memory of the mobile communication device;

determining a current account balance based on one or more transaction records stored in the non-transitory portion of the memory of the mobile communication device; and generating and displaying a usage report that includes the current account balance.

16. The method of claim 15, where the attribute of the transaction record is that of a destination mobile phone number of a voice call or text message of the mobile communication device.

17. The method of claim 15, where the attribute of the transaction record is a time of day associated with a data browsing session of the mobile communication device.

18. The method of claim 17, where the periodic usage report is generated every day, every week, or every month.

19. The method of claim 15, where the user-defined classification of a destination mobile phone number of the transaction record is one of a business or personal contact.

20. The method of claim 15, wherein the usage report is generated periodically, and wherein the usage report allocates the portion of mobile communication resources used by each of the user-defined classification based on the one or more transaction records.

* * * * *